Oct. 3, 1950 A. VAN WYK 2,524,279
DRILL POINT THINNING ATTACHMENT
Filed March 1, 1948 2 Sheets-Sheet 1
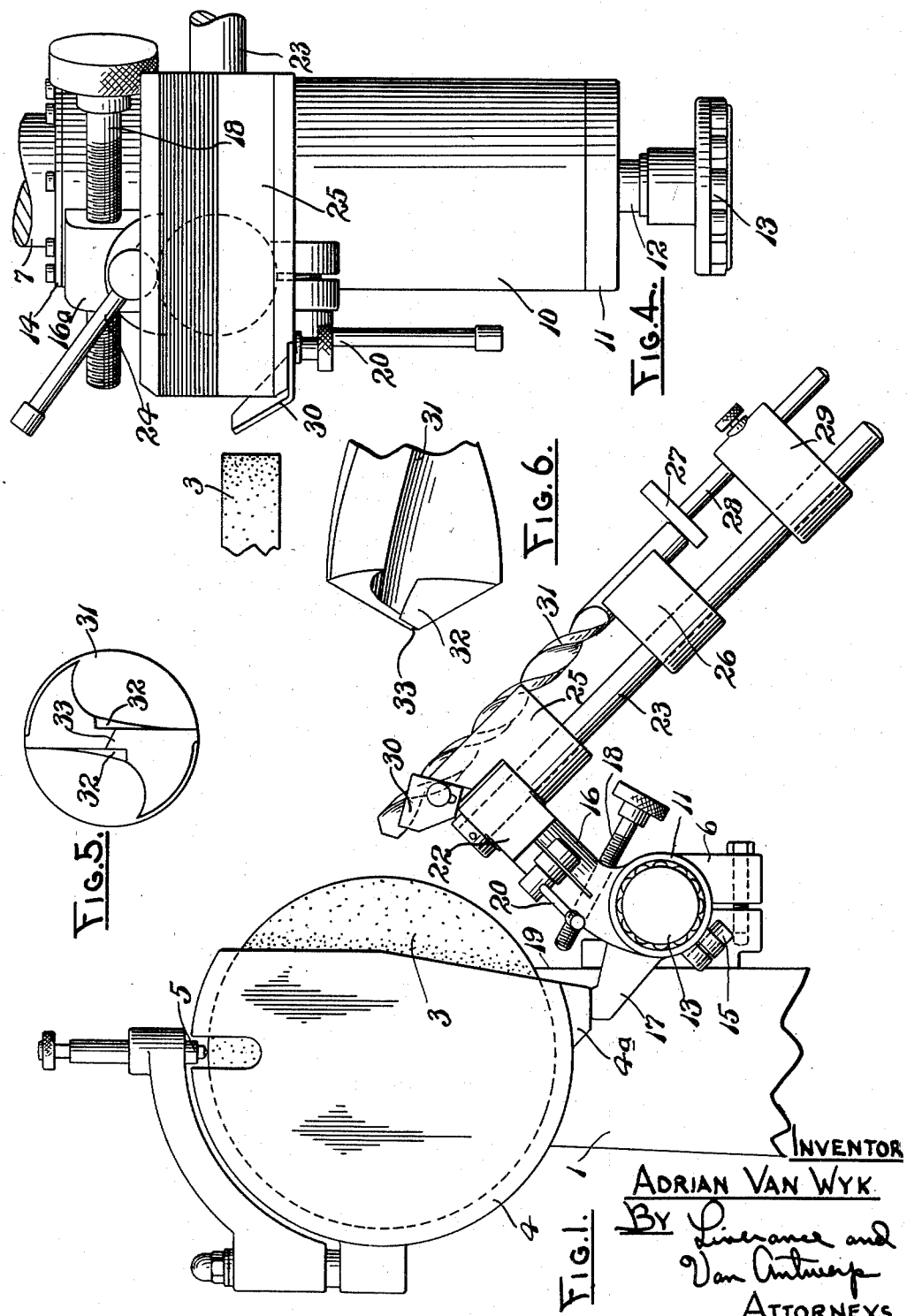
INVENTOR
ADRIAN VAN WYK
BY
ATTORNEYS

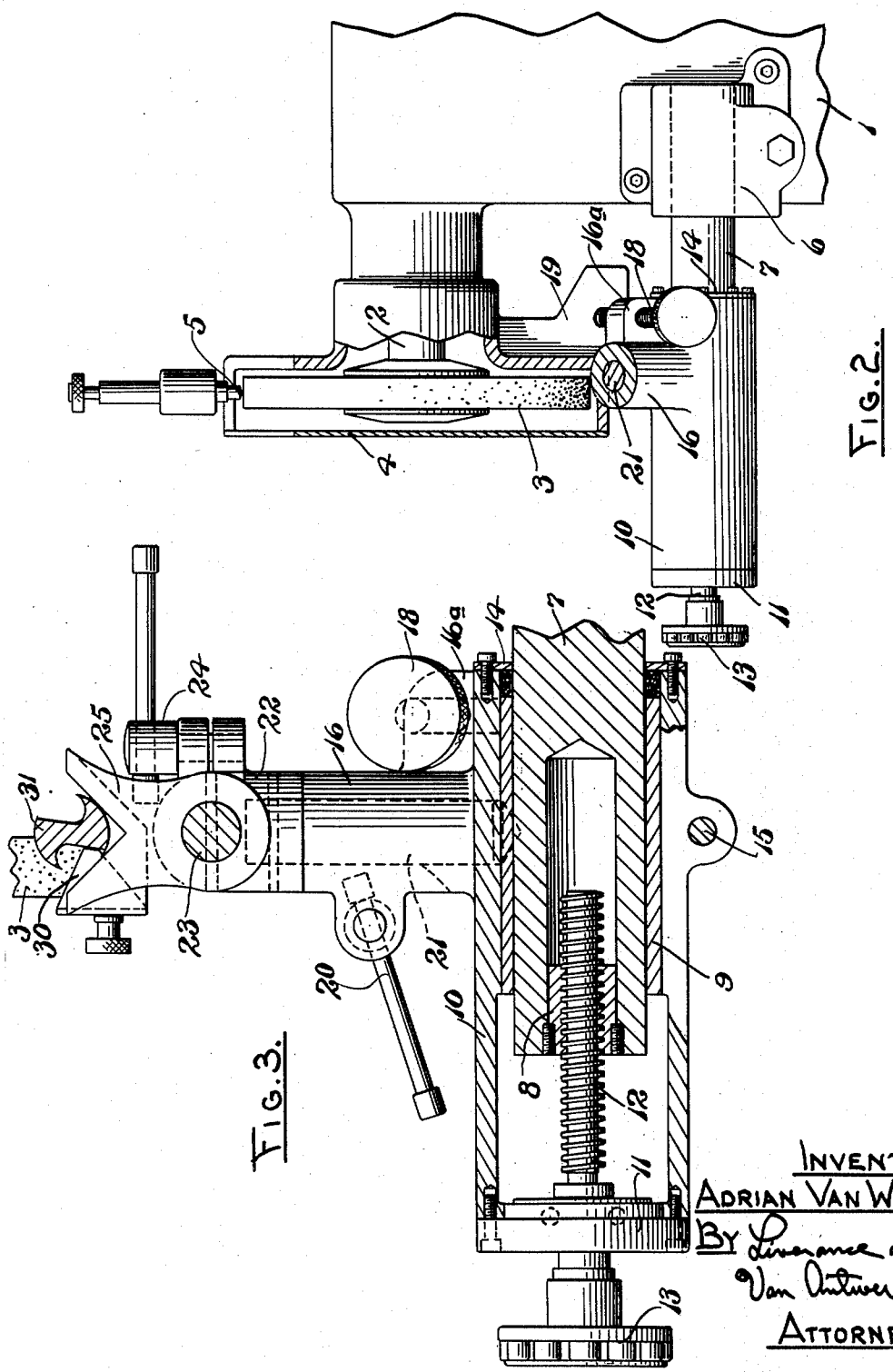

Patented Oct. 3, 1950

2,524,279

UNITED STATES PATENT OFFICE 2,524,279

DRILL POINT THINNING ATTACHMENT

Adrian Van Wyk, Grand Rapids, Mich., assignor to Gallmeyer & Livingston Company, Grand Rapids, Mich., a corporation of Michigan Application March 1, 1948, Serial No. 12,278

4 Claims. (Cl. 51—219)

This invention relates to a very practical, effective, novel and useful attachment for thinning drill points, particularly drills of the twist drill, or similar, types and characters.

When a drill is new and of full length, the thickness of the drill at its point between the flutes has been properly measured and provided. Drills are subject to wear and grinding at their pointed ends and, therefore, a decrease in length. With such decrease in length, the distance through or thickness of the drill between the helical grooves progressively increases as such thickness is not uniform for the length of the drill between its point and the shank at which the helical grooves end. Accordingly, with continued sharpening and grinding of the drill at its pointed end and a progressive decrease in length, the thickness of the drill at the point progressively increases.

It is a primary object and purpose of the present invention to provide a very practical and effective attachment for grinding machines whereby the drill may be thinned at its pointed end and accurately ground at each side to reduce the thickness at and adjacent the point and to insure that the same amount shall be ground at each side of the longitudinal center axis of the drill.

The present invention not only insures that the thinned part of the drill at and adjacent its point shall be accurately provided with equal amounts at and adjacent the drill point to each side of the longitudinal axis of the drill, but the extent to which the grinding and thinning is made back of the point is accurately controlled. Furthermore, as drills of different diameter dimensions require different thicknesses at and adjacent the point, the present invention simply and practically places within the control of the operator the necessary adjustment for the attainment of such result. There are many other adjustments for positioning the drill, as will appear.

An understanding of the invention may be had from the following description, taken in connection with the accompanying drawings, in which, Fig. 1 is an elevation showing the drill point thinning attachment of my invention mounted in operative association with a grinding wheel, Fig. 2 is a fragmentary front elevation with the drill holder removed and parts broken away and shown in section for disclosing the mechanism for movement of the drill point toward and away from the grinding wheel, Fig. 3 is a fragmentary enlarged plan and horizontal section illustrating the mechanism for lateral adjustment of the drill with respect to the grinding wheel with which it is associated, Fig. 4 is a fragmentary plan view of the lateral adjusting means and the upper end portion of the drill holder, Fig. 5 is an end view of a drill after it has been processed on the machine, and Fig. 6 is a fragmentary side elevation of the processed end of the drill.

Like reference characters refer to like parts in the different figures of the drawings.

A vertical pedestal support 1 has at the upper end and extending to one side thereof a driven shaft 2, upon which a vertically positioned grinding wheel 3 is secured, covered by the usual protecting hood 4, a portion of the wheel extending beyond the hood at what may be termed the front of the machine. The usual dressing implement 5 for dressing the periphery of the wheel is conventional and well known.

At the front side of the supporting pedestal 1 a bracket fixture 6 is bolted and receives one end portion of a cylindrical rod 7, which may be adjusted about its horizontal axis and clamped against turning movement by tightening the clamping screw of the split holding bracket 6, as shown in Fig. 1.

At its outer end the rod 7 is axially bored for a distance, at the outer end of which a nut 8 is secured, interiorly bored and threaded as shown in Fig. 3. A sleeve 9 surrounds the outer end portion of the rod 7 and a larger sleeve 10, longer than the sleeve 9 and longitudinally slotted from its inner end for part of its length at one side, surrounds said sleeve 9, extending outwardly beyond it and beyond the outer end of the rod 7. At its outer end it is closed by a closure 11, through which a shaft 12 passes and is rotatably mounted, the inner portion of which is threaded to screw through the nut 8. At its outer end it is equipped with a hand wheel 13 for manual turning. Thus the sleeve 10 may be adjusted in the direction of its length on the rod 7 and it also may be rocked back and forth about the longitudinal axis of the rod. At its inner end the sleeve 10 carries a ring 14 of flat metal secured thereto, through which the rod 7 passes and between which ring and the inner end of the sleeve 9 suitable packing is held. The sleeve 10 may be adjusted to different positions to which it is to be clamped upon the rod 7 and is turnable about such rod, by a clamping screw 15 at the longitudinally slotted side of the outer sleeve 10.

An arm or boss 16, integral with the outer sleeve 10 (Fig. 1), extends upwardly and forwardly, upon which a drill holder to carry the drill which is to be ground, is mounted. The rocking of the sleeve 10 about the longitudinal axis of the rod 7 is limited in both directions. A stop arm 17 extending from sleeve 10 comes at its end against an abutment 4a on the hood 4, limiting the turning movement of the sleeve 10 (Fig. 1) in a clockwise or outward direction. A screw 18 threaded through a lug 16a extending to one side of the arm 16 at its inner end comes against a stop at 19 in fixed relation to the supporting pedestal 1, thus limiting the reverse rocking movement of the sleeve 10 in an inward direction. It is apparent that by adjusting the screw 18 the extent or degree of rocking movement inwardly may be controlled and held to a preselected movement.

The arm 16 is axially bored and is split at one side, with which a clamping screw provided with a handle 20 is associated for tightening the arm upon a rod or stem 21 of the drill holder or carrier. Said stem 21 at its upper end is connected to a head 22 which rides against the upper end of the arm 16 and which, when the stem 20 is securely clamped, will with the drill carrier connected therewith be held in fixed relation to said arm 16.

In the drill holder construction a headed rod 23 passes through the head 22 and extends downwardly and forwardly therefrom, the head 22 likewise being split at one side and provided with a clamping means 24 to clamp against and hold the rod 23 against movement. The drill which is to be ground and thinned at and adjacent its point is carried in two V-shaped carriers 25 and 26, the latter below and outwardly of the former. Toward the lower end of the rod 23 a backing plate 27 for the end of the drill opposite its point is carried on a rod 28, slidable through a block 29 secured to the rod 23, and which may be held in any position to which it is moved through the block 29 by a set screw as shown.

At the upper inner end of one side of the upper V-shaped drill carrier 25, a stop plate 30 is adjustably mounted, which has a free end bent inwardly and across the front upper end of the V-holder, against which one side of a flute of a drill 31 which is to be ground is placed for positioning the drill. The drill remains in such position when the drill holder with the drill therein is lifted upwardly and moved toward the grinding wheel 3 about the horizontal axis of the rod 7. It is of course apparent that the drill holder and the drill carried thereby, being connected with the sleeve 10, may be readily adjusted so as to bring the pointed upper end of the drill against the periphery and a vertical side of the grinding wheel 3 so as to grind a flat surface at 32 at a side of the pointed end of the drill and at a short distance to one side of the longitudinal axis of the drill. The distance back that the pointed end of the drill will be ground at one side is controlled by the adjustment of the screw 18, the end of which coming against the stop at 19 stops the movement of the drill inwardly with reference to the grinding wheel 3. Then by turning the drill over or through a half circle and bringing the opposite side of the flute against the stop 30, the drill at and adjacent its point 33 is ground an equal amount at such opposite side at 32, as shown in Fig. 5, the pointed end of the drill and parts adjacent thereto being simultaneously ground equal amounts and at equal distances from a plane containing the longitudinal axis of the drill which is parallel to the surfaces at 32 which are ground.

It is apparent that with the adjustments provided the drill may be variously positioned at many angles with reference to the grinding wheel and that different drills may be properly located and positioned. Any drill having a standard thickness at or closely adjacent the point when new, can be maintained at such thickness by thinning the progressively increasingly thick center of the drill as it is worn off and reground at its end.

The structure is very practical and useful and is particularly desirable in properly thinning drills at their adjacent pointed ends as they are used up in service.

The invention is defined in the appended claims and is to be considered comprehensive of all forms of structure coming within their scope.

I claim:

1. In a machine of the class described, a grinding wheel mounted to turn about a horizontal axis and positioned vertically, a support adjacent said grinding wheel, a horizontal rod mounted on said support below and on an axis parallel to the axis of rotation of the grinding wheel, a sleeve rockably mounted on said rod, an arm connected with said sleeve extending upwardly toward the adjacent edges of the grinding wheel, a drill holder carried by said arm extending outwardly away from the grinding wheel, said drill holder having structure adapted to carry a drill with its pointed end adjacent the grinding wheel, manually operable means for adjusting said sleeve lengthwise of said rod on which it is carried, adjustable means carried by said arm, a stop carried by said support against which said adjustable means engages on rocking the sleeve, arm and drill holder toward the grinding wheel, and a stop means at the upper end of the drill holder, against which a drill carried thereby is adapted to engage at opposite sides of the drill for grinding said drill at and adjacent its point in planes substantially parallel to each other, each located substantially equal distances from the longitudinal center line of the drill.

2. A structure as defined in claim 1, said adjustable means carried by the arm comprising, a screw threaded through said arm, the upper inner end of which is adapted to come against said stop carried by the support to limit the rocking movement of said sleeve and drill holder in the movement thereof toward the grinding wheel.

3. A structure as defined in claim 1, said means for longitudinally adjusting said sleeve on said rod comprising, a nut fastened at the outer end of said rod, said rod having a longitudinal axial boring from its outer end inwardly for a distance, a closure for the outer end of the sleeve, a rod extending through and rotatably mounted on said sleeve having a threaded inner end portion passing through said nut, and manually engageable means at the outer end of said threaded rod for turning it.

4. A structure as defined in claim 1, said sleeve being longitudinally slotted at one side, and means adjustably connecting the sleeve at opposite sides of the slot therein for contracting or releasing said sleeve.

ADRIAN VAN WYK.

REFERENCES CITED

The following references are of record in the file of this patent:

UNITED STATES PATENTS

| Number | Name | Date |
|---|---|---|
| 497,095 | Hall | May 9, 1893 |
| 1,020,860 | Vauclain | Mar. 19, 1912 |
| 1,448,746 | Hunt et al. | Mar. 20, 1923 |
| 1,710,647 | Roberts et al. | Apr. 23, 1929 |
| 2,144,095 | Zwick | Jan. 17, 1939 |
| 2,334,089 | Hallden | Nov. 9, 1943 |

FOREIGN PATENTS

| Number | Country | Date |
|---|---|---|
| 884,072 | France | Apr. 12, 1943 |